Dec. 29, 1925.
F. N. GUYMON
TROUGH
1,567,944
Filed July 10, 1925    2 Sheets-Sheet 1
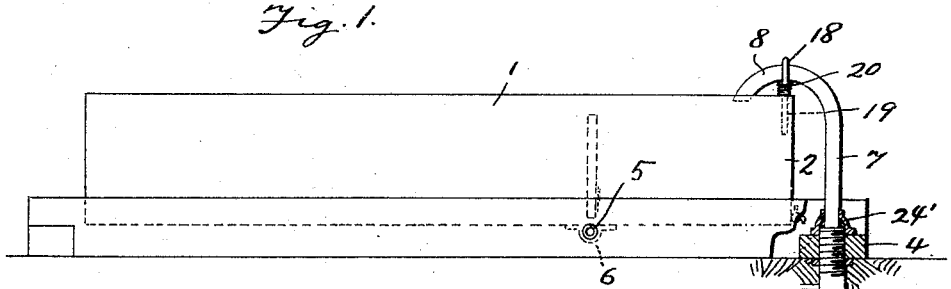
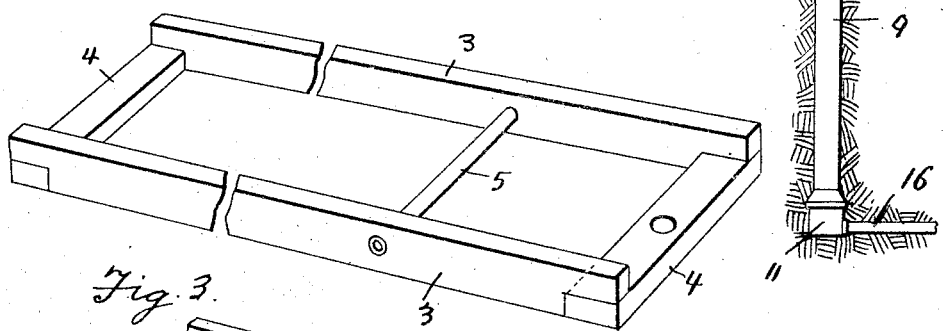
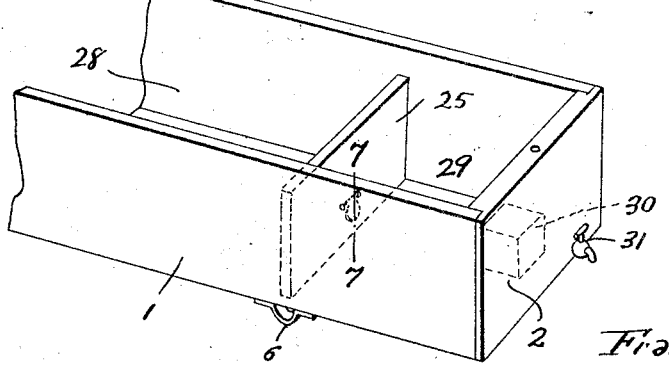
Franklin N. Guymon
INVENTOR
BY Victor J. Evans
ATTORNEY
WITNESS: S. C. Carroll
Gerald Henney Jr.

Dec. 29, 1925.    1,567,944
F. N. GUYMON
TROUGH
Filed July 10, 1925    2 Sheets-Sheet 2

Franklin N. Guymon
INVENTOR

BY Victor J. Evans
ATTORNEY

Patented Dec. 29, 1925.

1,567,944

UNITED STATES PATENT OFFICE.

FRANKLIN NOAH GUYMON, OF HUNTINGTON, UTAH.

TROUGH.

Application filed July 10, 1925. Serial No. 42,812.

*To all whom it may concern:*

Be it known that I, FRANKLIN NOAH GUYMON, a citizen of the United States, residing at Huntington, in the county of Emery and State of Utah, have invented new and useful Improvements in Troughs, of which the following is a specification.

This invention relates to drinking or watering troughs for stock and the like and more particularly to the automatic water supply type.

The primary object of the invention is to provide the watering trough of the automatic water supply type that functions to be continuously supplied with water to a fixed height, such being accomplished by the weight of the water in the trough as if the water gets below a certain level the overflow means is put into operation to bring the water up to the desired level, but never to an extent of overflowing.

A further object is to provide an automatic filling water trough having its water supply means adequately protected against freezing, thereby the device will operate adequately and advantageously in all seasons and substantially at all temperatures.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 1 is a side elevation of the trough and its filling means which forms the subject matter of the present invention.

Figure 2 is a perspective view of the base for the watering trough.

Figure 3 is a fragmentary perspective view of the trough.

Figure 7 is a sectional view taken on line 7—7 of Figure 3.

Figure 4:
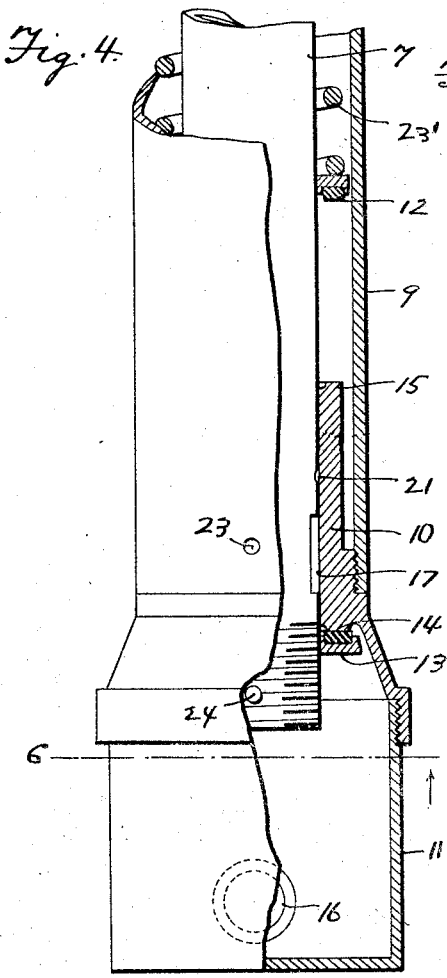
Figure 4 is a fragmentary side elevation of the valve means arranged in closed position.

Referring to the drawings in detail the reference numeral 1 indicates a watering trough of the usual elongated rectangular formation formed with a bottom, side and end walls, one of the end walls being indicated by the reference numeral 2. The watering trough 1 is supported by a base which includes elongated strips 3 having fixed to the ends thereof cross pieces 4 and bridging the base adjacent one end thereof is a rod 5 adapted to receive U-shaped bearing members 6, fixed to the bottom of the trough adjacent each side thereof as suggested in Figure 3 of the drawings. By this structure it will be apparent that the trough is mounted for pivotal movement on the base and for a purpose which will be presently described.

Figure 5:
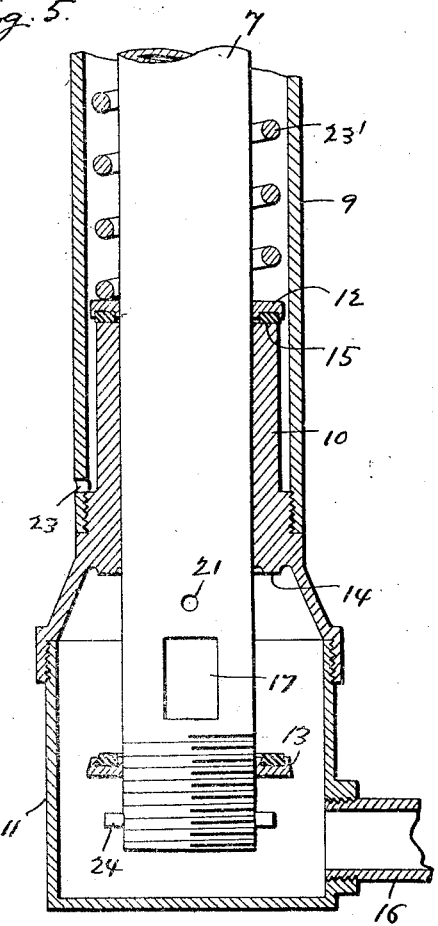
Figure 5 is a fragmentary vertical sectional view through the valve means showing the parts in open position.
Figure 6:
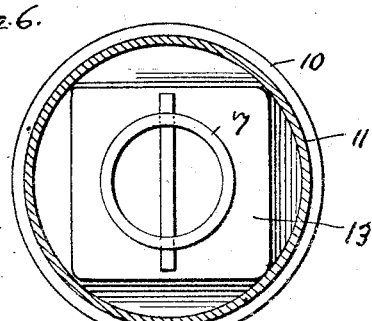
Figure 6 is a sectional view taken on line 6—6 of Figure 4.

The means for supplying water to the trough includes a pipe 7 having its upper end bent in goose neck formation as at 8, and said pipe is mounted for vertical movement in a casing 9 which is buried in the ground adjacent the trough and has its upper end passing through the adjacent cross piece 4 of the base as shown in Figure 1 of the drawings. The lower end of the casing 9 is threadedly secured to a valve seat sleeve 10 having a flared lower end which is in turn threadedly secured to a valve casing 11 cylindrical in formation, but it should be noted that the valve seat sleeve 10 adjacent its juncture with its flared portion tapers into a square formation as shown in Figure 6 of the drawings, while the upper portion of the valve seat sleeve is cylindrical to slidably receive the lower end of the pipe 7 which has surrounding adjacent said lower end in spaced relation a pair of similar shaped valves 12 and 13, the lower valve seat 14 being adapted to accommodate the valve 13 when the pipe is in its uppermost position as shown in Figure 4 and the valve seat 15 being adapted to accommodate the valve 12 when the pipe 7 is in its lowermost position as shown in Figure 5.

Communicating with the valve casing 11 is a water supply conduit 16, and formed in the lower end of the pipe is a rectangular shaped opening 17 adapted to be in communication with the valve casing 11 to receive water therefrom when the pipe 7 is in its lowermost position.

The pipe 7 is moved in its casing 9 through the medium of the trough 1 and for this purpose the goose neck portion 8 is fixed to the trough through the instrumentality of a ring member 18 from which depends a pin 19 fixed within the opening formed centrally in the upper edge of one end of the trough but is mounted therein for vertical movement and to put the ring member under tension there is provided a coil spring 20.

While the valve means for supplying the trough with water is buried sufficient distance in the ground to prevent freezing it will be apparent from the structure so far described that water is admitted to the pipe 7 and in order to drain the pipe 7 during freezing periods, the same is provided with an opening 21 as shown in Figure 4 of the drawings and which is adapted to be arranged above the valve seat sleeve 10 when the pipe 7 is in its normal position, the valve 13 is threadedly secured thereto and therefore can be moved longitudinally on the pipe so as to allow the opening 21 to be arranged above the said valve seat sleeve 10 as above set forth. The casing 9 is provided with an opening 23 so as to allow the water to drain therefrom. The lower end of the pipe 7 is closed and arranged upon diametrically opposite sides thereof are studs 24 so as to limit the downward movement of the valve 13.

A coil spring 23' surrounds the pipe 7 and has its end convolutions engaging the valve 12 and a packing gland 24' which is threadedly secured to the upper end of the casing. The action of the coil spring is to put the vertical movement of the pipe 7 under tension to assist in actuating the valve means.

Transversing the trough adjacent one end and in a line with its pivot point is an upright water stop 25 which is provided with an opening 26 adjacent its lower end and said opening is controlled by a flap valve 27 so as to permit water to pass from the portion 28 of the trough to the portion 29 thereof. The upper end of the upright water stop 25 is spaced from the upper edges of the trough to permit the water to overflow into the portion 28 after the portion 29 has been filled to its greatest capacity for a purpose which will be presently described.

From the foregoing and disclosure as presented by the drawings it will be obvious that the means for supplying water to the trough is automatic in its operation as when the water gets below a certain level in the portion 28 thereof the weight of the water together with the aid of a weight 30 in the portion 29 will cause the trough to balance in that direction on its pivot with the result that the pipe 7 which is secured to the end wall as shown will be caused to be moved downwardly in the casing 9 and therefore put the opening 17 in communication with the valve casing 11 with the result that the trough will be filled until the water has raised to its sufficient level within the portion 28 of the trough to counter-balance the weight of the water and the weight 30 in the portion 29 and therefore cause the trough to be moved in an opposite direction on its pivot to raise the pipe 7 in its uppermost position as shown in Figure 4.

The portion 29 is provided with a pet cock 31 so that it can be drained if desired.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A watering trough of the character described comprising a base, a trough pivotally secured thereto adjacent one end, a vertically disposed pipe having its upper end secured to said end of the trough, means associated with the lower end of said pipe to introduce water therein for said trough upon movement of the trough in one direction.

2. A watering trough of the character described comprising a base, a rectangular trough pivotally secured thereto adjacent one end thereof, cross pieces included in said base, a casing vertically disposed and having one end fixed to said cross piece, a pipe having its upper end formed gooseneck shape in formation and having this end secured to the pivoted end of the trough, a valve seat sleeve threadedly secured to the lower end of said casing and receiving the lower end of said pipe for vertical movement therein, a valve casing in communication with a water supply and being fixed to the lower end of the valve seat sleeve, and said pipe being provided with an opening in its lower end for communication with the valve casing for receiving water therefrom and to supply the latter to the trough upon movement of said trough in one direction.

3. A watering trough of the character described comprising a base, a trough pivotally secured thereto adjacent one end, an upright water stop extending across said trough in alignment with the pivot point thereof and terminating below the top of said trough, said upright water stop being valved and dividing the trough into portions, a vertically disposed pipe having its upper end curved to overlie one of said portions and being fixed to one end of said trough, a casing receiving said pipe which is mounted for vertical movement therein and being under tension, means for supplying water to the lower end of said pipe when said pipe is in its lowermost position, and said pipe being moved to lowermost position when the weight of the water in the last mentioned portion of said trough over balances the weight of the other of said portion.

4. A watering trough of the character described comprising a base, a trough pivotally secured thereto, a casing vertically disposed and having its upper end passing through the base at one end thereof, a valve seat sleeve threadedly secured to the lower end of said casing, a valve seat formed on each end of said valve seat sleeve, a pipe mounted for vertical movement through said casing, a valve fixed to said pipe and being associated with the upper valve seat, a second valve seat threadedly secured to said pipe and being associated with the other of said valve seats, said pipe being capable of being rotated for moving the threadedly secured valve longitudinally thereon and for the purpose of allowing openings formed in said pipe and valve seat sleeve to register, a valve casing threadedly secured to the lower end of said valve seat sleeve, means for supplying water to said valve casing, said pipe having its upper end overlying and resiliently secured to the trough, and having an opening in its lower end capable of being in communication with the valve casing for supplying water to the trough as and for the purpose specified.

In testimony whereof I affix my signature.

FRANKLIN NOAH GUYMON.